(12) United States Patent
Gibson et al.

(10) Patent No.: US 10,362,884 B1
(45) Date of Patent: Jul. 30, 2019

(54) CHILD-RESTRAINING HARNESS AND BIB

(71) Applicants: Terry Gibson, Mobile, AL (US);
William Gibson, Mobile, AL (US)

(72) Inventors: Terry Gibson, Mobile, AL (US);
William Gibson, Mobile, AL (US)

( * ) Notice: Subject to any disclaimer, the term of this patent is extended or adjusted under 35 U.S.C. 154(b) by 15 days.

(21) Appl. No.: 15/805,229

(22) Filed: Nov. 7, 2017

(51) Int. Cl.
*A47D 15/00* (2006.01)
*A41B 13/10* (2006.01)
*B60R 21/00* (2006.01)

(52) U.S. Cl.
CPC .......... *A47D 15/006* (2013.01); *A41B 13/103* (2013.01); *A41B 2300/32* (2013.01); *B60R 2021/0044* (2013.01); *B60R 2021/0055* (2013.01)

(58) Field of Classification Search
CPC ................ A47D 15/006; A41B 13/103; B60R 2021/0044; B60R 2021/0055
USPC ........................................ 297/465, 467, 485
See application file for complete search history.

(56) References Cited

U.S. PATENT DOCUMENTS

| 2,451,007 | A | * | 10/1948 | White | A47D 15/006 182/3 |
| 3,713,692 | A | | 1/1973 | Watkins | |
| 4,050,737 | A | * | 9/1977 | Jordan | A47D 15/006 128/875 |
| 4,235,474 | A | | 11/1980 | Rosenberg | |
| 4,428,514 | A | * | 1/1984 | Elf | A47D 13/025 224/155 |
| 4,710,979 | A | | 12/1987 | Bull | |
| 5,042,878 | A | * | 8/1991 | Collins | A61F 5/3792 297/465 |
| 5,676,426 | A | | 10/1997 | Herring | |
| 5,815,834 | A | | 10/1998 | Bronson | |
| D467,392 | S | | 12/2002 | Ferguson | |
| 7,073,866 | B1 | | 7/2006 | Berdahl | |
| 2009/0189425 | A1 | | 7/2009 | Powell | |

FOREIGN PATENT DOCUMENTS

CA 2237127 C 12/2002

\* cited by examiner

*Primary Examiner* — Syed A Islam
(74) *Attorney, Agent, or Firm* — Kyle A. Fletcher, Esq.

(57) ABSTRACT

The child-restraining harness and bib is a safety device. The child-restraining harness and bib is further configured for use with a person selected from the group consisting of an infant and a toddler. The child-restraining harness and bib is configured for use with a chair. The child-restraining harness and bib secures the person to the chair. The child-restraining harness and bib comprises the body harness and the bib. The body harness attaches the person to the chair. The bib stores the body harness when the body harness is not in use. The bib is worn by the person to protect the clothing worn by the person when the body harness is in use.

15 Claims, 6 Drawing Sheets

CHILD-RESTRAINING HARNESS AND BIB

CROSS REFERENCES TO RELATED APPLICATIONS

Not Applicable

STATEMENT REGARDING FEDERALLY SPONSORED RESEARCH

Not Applicable

REFERENCE TO APPENDIX

Not Applicable

BACKGROUND OF THE INVENTION

Field of the Invention

The present invention relates to the field of personal and domestic articles including furniture specially adapted for children, more specifically, a child's safety harness configured for use with furniture.

SUMMARY OF INVENTION

The child-restraining harness and bib is a safety device. The child-restraining harness and bib is further configured for use with a person selected from the group consisting of an infant and a toddler. The child-restraining harness and bib is configured for use with a chair. The child-restraining harness and bib secures the person to the chair. The child-restraining harness and bib comprises the body harness and the bib. The body harness attaches the person to the chair. The bib stores the body harness when the body harness is not in use. The bib is worn by the person to protect the clothing worn by the person when the body harness is in use.

These together with additional objects, features and advantages of the child-restraining harness and bib will be readily apparent to those of ordinary skill in the art upon reading the following detailed description of the presently preferred, but nonetheless illustrative, embodiments when taken in conjunction with the accompanying drawings.

In this respect, before explaining the current embodiments of the child-restraining harness and bib in detail, it is to be understood that the child-restraining harness and bib is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the child-restraining harness and bib.

It is therefore important that the claims be regarded as including such equivalent construction insofar as they do not depart from the spirit and scope of the child-restraining harness and bib. It is also to be understood that the phraseology and terminology employed herein are for purposes of description and should not be regarded as limiting.

BRIEF DESCRIPTION OF DRAWINGS

The accompanying drawings, which are included to provide a further understanding of the invention are incorporated in and constitute a part of this specification, illustrate an embodiment of the invention and together with the description serve to explain the principles of the invention. They are meant to be exemplary illustrations provided to enable persons skilled in the art to practice the disclosure and are not intended to limit the scope of the appended claims.

DETAILED DESCRIPTION OF THE EMBODIMENT

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description.

Figure 1:
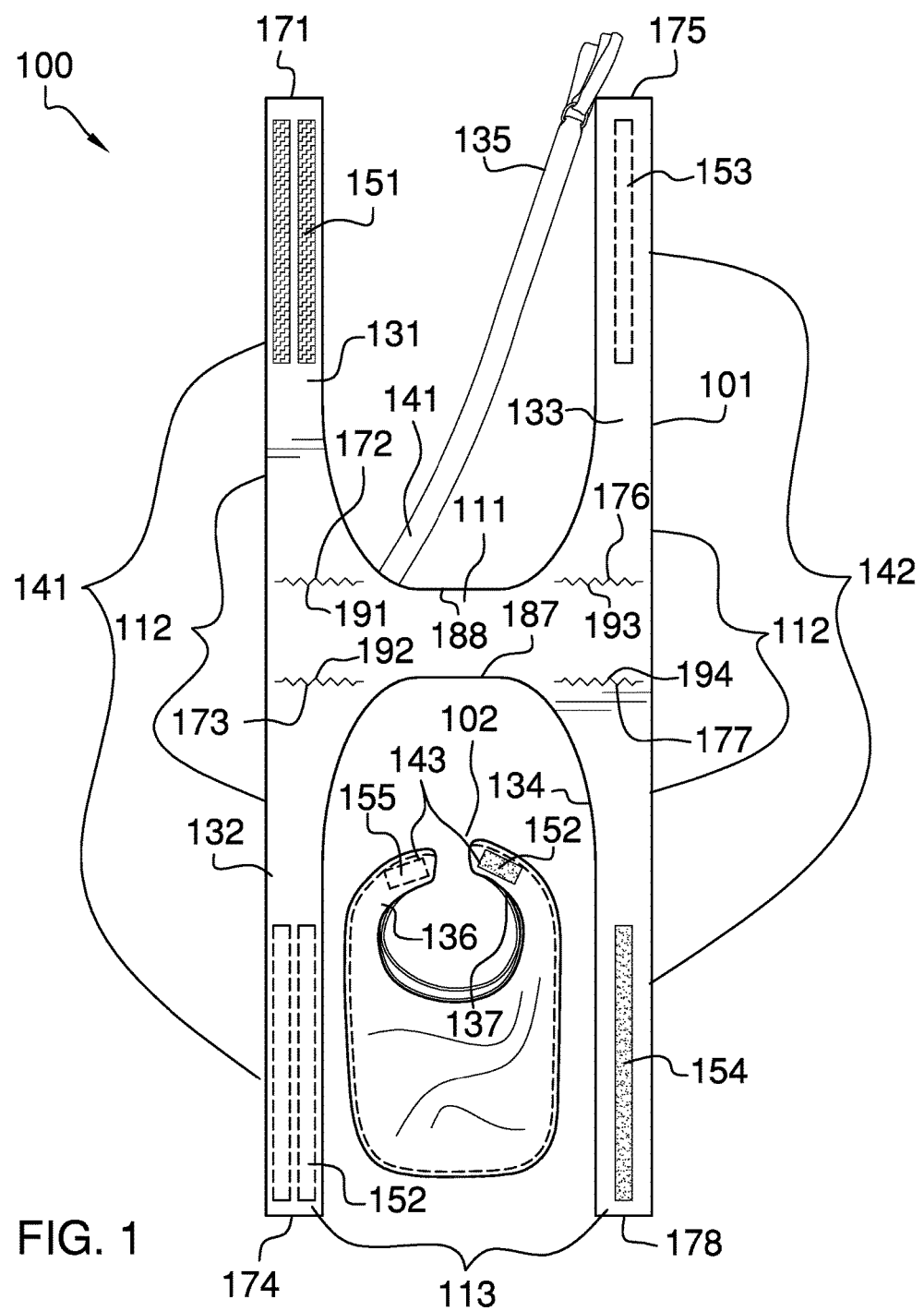
FIG. 1 is a front view of an embodiment of the disclosure.
Figure 2:
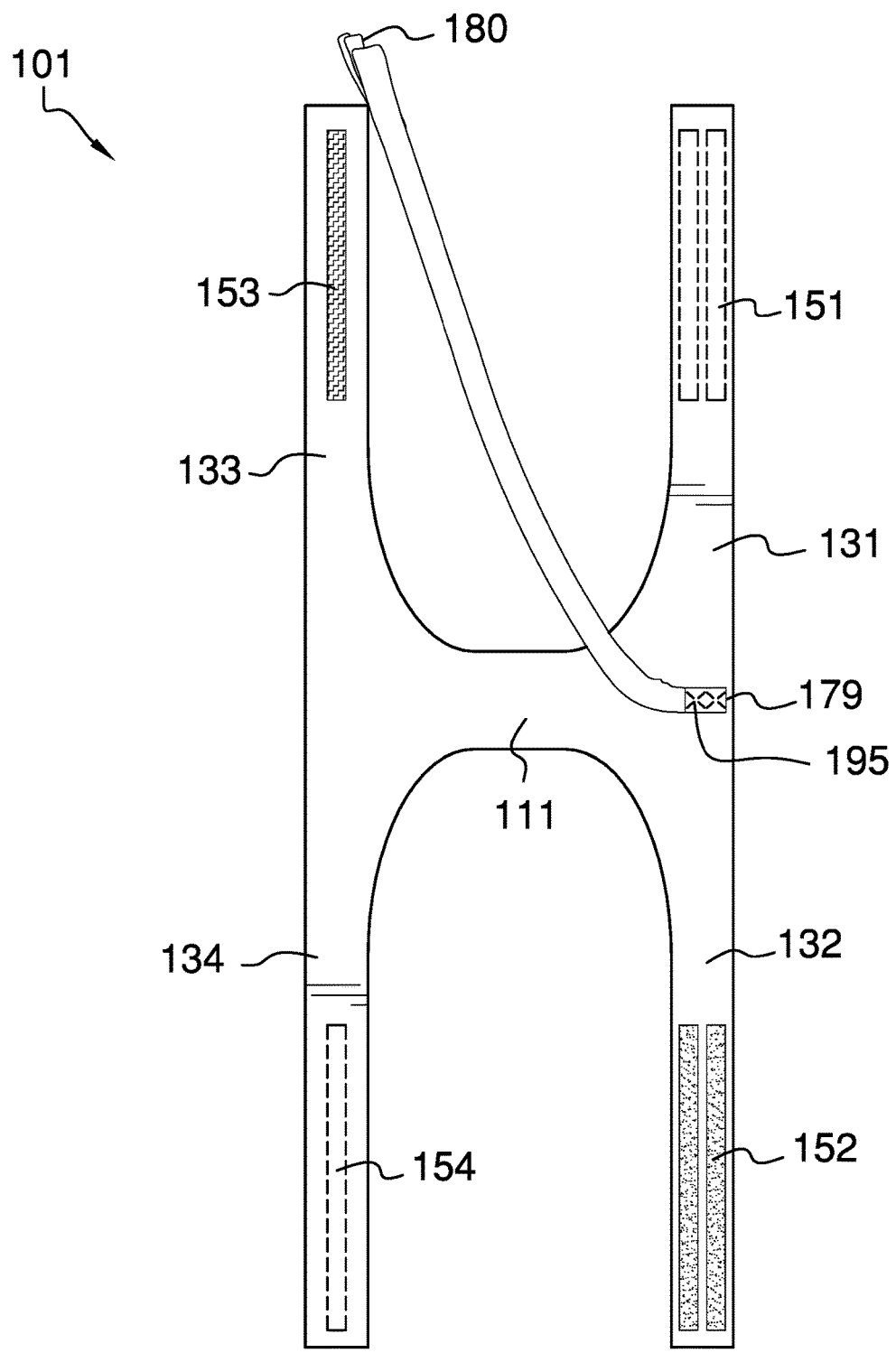
FIG. 2 is a rear view of a detail of an embodiment of the disclosure.
Figure 3:
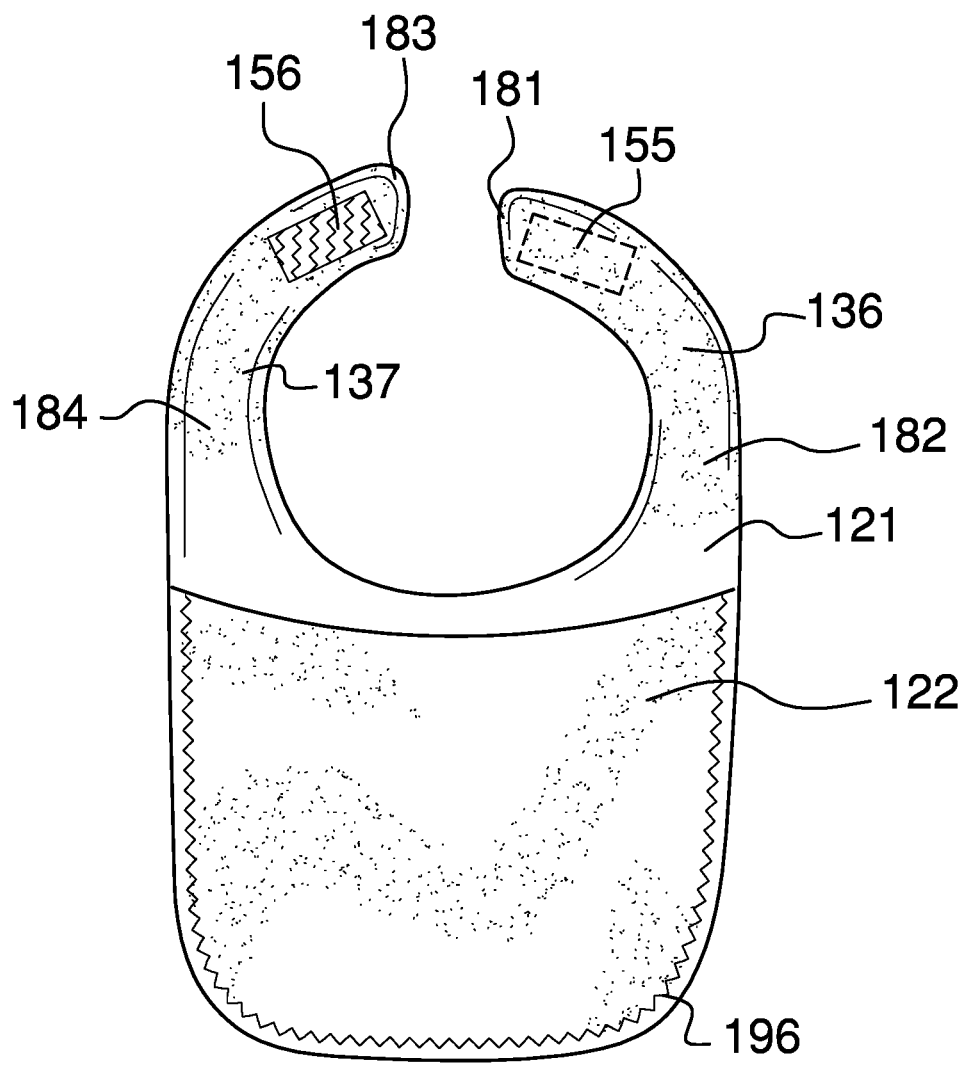
FIG. 3 is a rear view of a detail of an embodiment of the disclosure.
Figure 4:
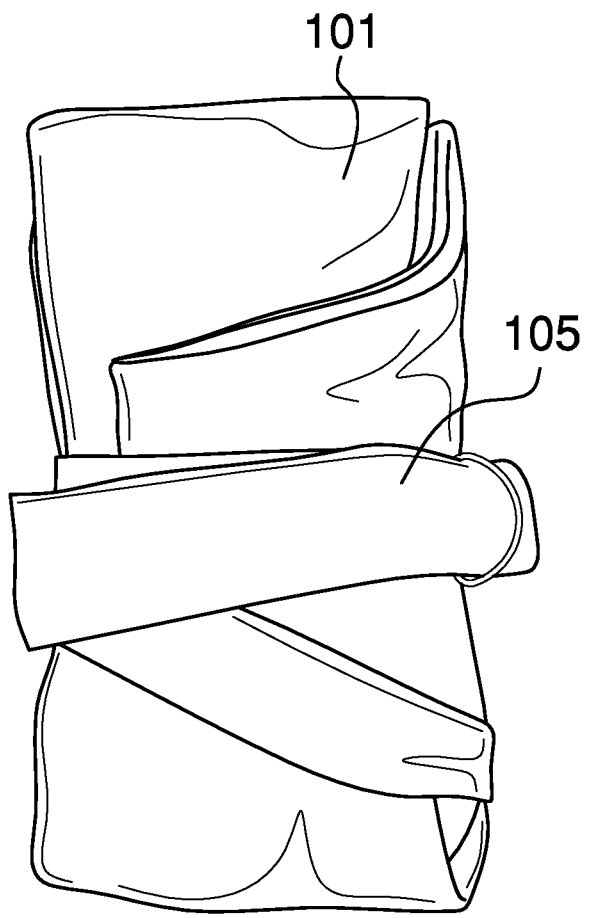
FIG. 4 is a detail view of an embodiment of the disclosure.
Figure 5:
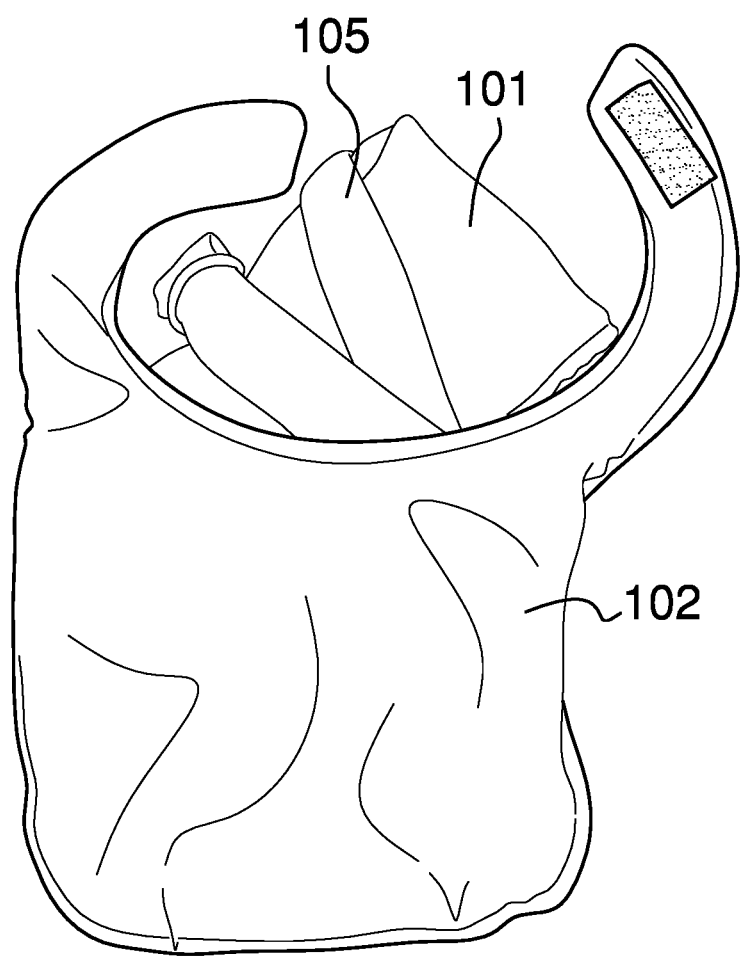
FIG. 5 is a detail view of an embodiment of the disclosure.
Figure 6:
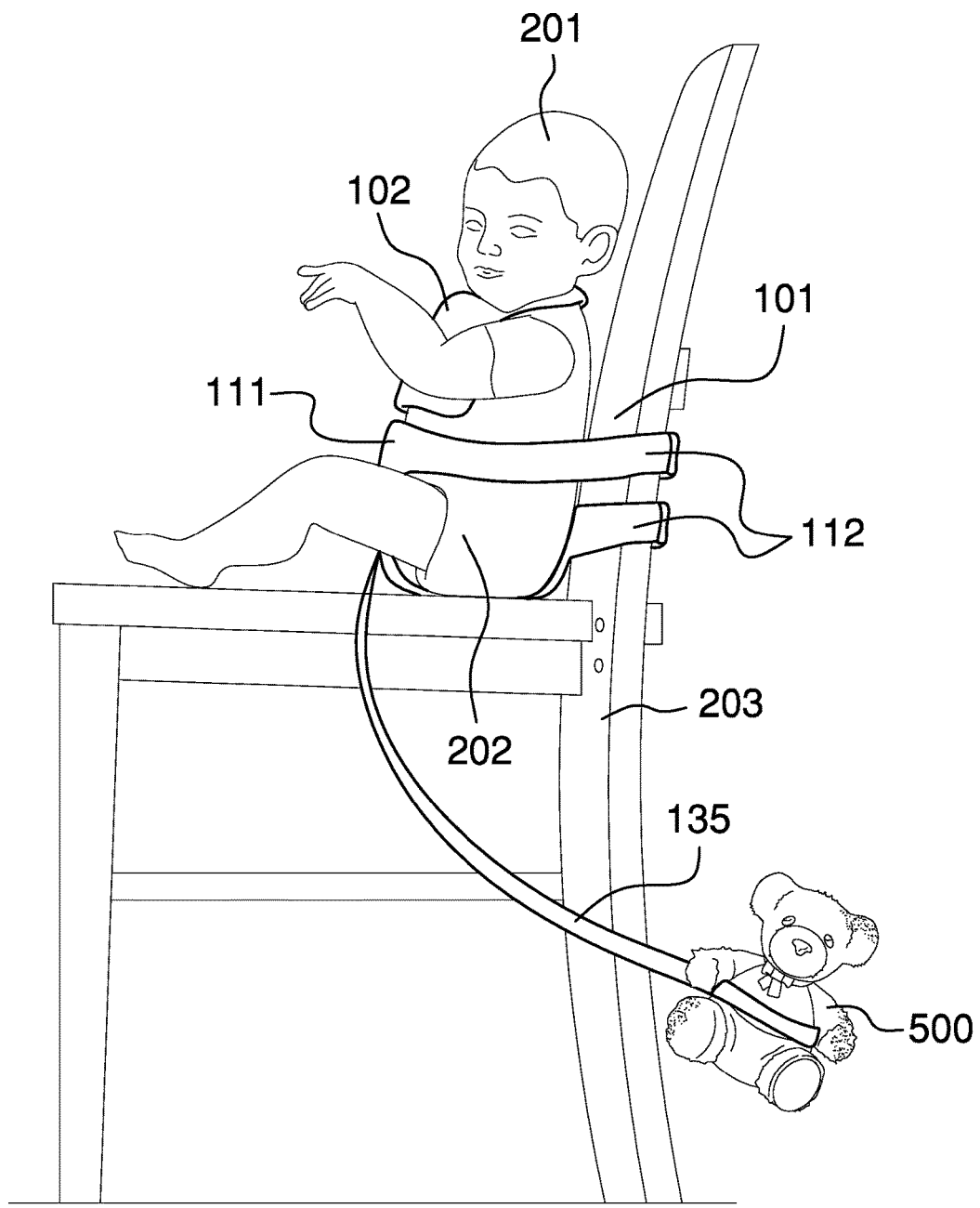
FIG. 6 is an in-use view of an embodiment of the disclosure.

Detailed reference will now be made to one or more potential embodiments of the disclosure, which are illustrated in FIGS. 1 through 6.

The child-restraining harness and bib 100 (hereinafter invention) is a safety device. The invention 100 is further configured for use with a person 201 selected from the group consisting of an infant and a toddler. The person 201 is further defined with a pelvis 202. The invention 100 is configured for use with a chair 203. The invention 100 secures the person 201 to the chair 203. The invention 100 comprises a body harness 101 and a bib 102. The body harness 101 attaches the person 201 to the chair 203. The bib 102 stores the body harness 101 when the body harness 101 is not in use. The bib 102 is worn by the person 201 to protect the clothing worn by the person 201 when the body harness 101 is in use.

The body harness 101 is a harness adapted for use by the person 201. The body harness 101 secures the person 201 to the chair 203. The chair 203 is not specifically adapted for use by a person 201 selected from the group consisting of an infant or a toddler. The body harness 101 is roughly shaped as two hyoid structures that form a mirror image formed using the crossbeam as the axis of reflection. The body harness 101 comprises a pelvic strap 111, a plurality of harness straps 112, and a plurality of harness fasteners 113. The pelvic strap 111 is further defined with a fifteenth end 185, a sixteenth end 186, an inferior end 187, and a superior end 188.

The pelvic strap 111 is a commercially available webbing. During normal use of the invention 100, the pelvic strap 111 is positioned from the chest of the person 201 while wrapping underneath the pelvis 202 between the legs and along the superior surface of the chair 203. In this manner, the pelvic strap 111 secures the torso of the person 201 to the chair 203.

The plurality of harness straps 112 comprises a collection of straps that: 1) attach the pelvic strap 111 to the back of the chair 203; and, 2) trusses the body harness 101 into a package suitable for storage in the bib 102. The plurality of harness straps 112 comprises a first strap 131, a second strap 132, a third strap 133, a fourth strap 134, and a fifth strap 135. The first strap 131 is further defined with a first end 171 and a second end 172. The second strap 132 is further defined with a third end 173 and a fourth end 174. The third strap 133 is further defined with a fifth end 175 and a sixth end 176. The fourth strap 134 is further defined with a seventh end 177 and an eighth end 178. The fifth strap 135 is further defined with a ninth end 179 and a tenth end 180.

The first strap 131 is a commercially available webbing. The second strap 132 is a commercially available webbing. The third strap 133 is a commercially available webbing. The fourth strap 134 is a commercially available webbing. The fifth strap 135 is a commercially available webbing. The fifth strap 135 trusses the body harness 101 into a package that fits in the pocket formed in the bib 102 (see FIG. 5). The fifth strap 135 may also be used to secure an object 500 (see FIG. 6) thereto.

The plurality of harness fasteners 113 comprises a collection of fasteners that secure the plurality of harness straps 112 to the back of the chair 203. The plurality of harness fasteners 113 comprises a first hook and loop fastener 141 and a second hook and loop fastener 142. The first hook and loop fastener 141 is further defined with a first hook/loop surface 151 and a second hook/loop surface 152. The second hook and loop fastener 142 is further defined with a third hook/loop surface 153 and a fourth hook/loop surface 154.

The first hook and loop fastener 141 is a commercially available fastening device that attaches the first strap 131 to the second strap 132. The first hook/loop surface 151 attaches to the second hook/loop surface 152 to form the first hook and loop fastener 141. The second hook/loop surface 152 attaches to the first hook/loop surface 151 to form the first hook and loop fastener 141.

The second hook and loop fastener 142 is a commercially available fastening device that attaches the third strap 133 to the fourth strap 134. The third hook/loop surface 153 attaches to the fourth hook/loop surface 154 to form the second hook and loop fastener 142. The fourth hook/loop surface 154 attaches to the third hook/loop surface 153 to form the second hook and loop fastener 142.

The bib 102 is a protective garment. The use of a bib 102 by a person 201 is well-known and documented. The bib 102 is worn over the clothing of the person 201 during use of the invention 100. The bib 102 stores the body harness 101 when the invention 100 is not in use. The bib 102 comprises a barrier 121 and a pocket sheeting 122.

The barrier 121 is a sheeting that forms the primary protective covering placed over the clothing. The barrier 121 comprises a sixth strap 136, a seventh strap 137, and a third hook and loop fastener 143. The sixth strap 136 is a commercially available webbing. The seventh strap 137 is a commercially available webbing. The sixth strap 136 is further defined with an eleventh end 181 and a twelfth end 182. The seventh strap 137 is further defined with a thirteenth end 183 and a fourteenth end 184. The sixth strap 136 attaches to the seventh strap 137 to attach the barrier 121 to the person 203.

The pocket sheeting 122 is a sheeting. A portion of the perimeter of the pocket sheeting 122 is geometrically similar to a portion of the perimeter of the barrier 121. The pocket sheeting 122 is larger than the barrier 121 such that when the pocket sheeting 122 is aligned with and attached to the barrier 121 the pocket sheeting 122 forms a partially enclosed space between the pocket sheeting 122 and the barrier 121 that is used as a pocket to store the body harness 101.

The third hook and loop fastener 143 is a commercially available fastening device that attaches the sixth strap 136 to the seventh strap 137. The third hook and loop fastener 143 is further defined with a fifth hook/loop surface 155 and a sixth hook/loop surface 156. The fifth hook/loop surface 155 attaches to the sixth hook/loop surface 156 to form the third hook and loop fastener 143. The sixth hook/loop surface 156 attaches to the fifth hook/loop surface 155 to form the third hook and loop fastener 143. The hook and loop fastener and hook/loop surfaces are well-known and documented devices that are discussed in greater detail elsewhere in this disclosure.

The following six paragraphs describe the assembly of the invention 100.

The invention 100 is assembled using a first seam 191, a second seam 192, a third seam 193, a fourth seam 194, a fifth seam 195, and a sixth seam 196.

The first seam 191 attaches the second end 172 of the first strap 131 to the superior end 188 of the pelvic strap 111 such that the first strap 131 lays flush with the fifteenth end 185 of the pelvic strap 111. The second seam 192 attaches the third end 173 of the second strap 132 to the inferior end 187 of the pelvic strap 111 such that the second strap 132 lays flush with the fifteenth end 185 of the pelvic strap 111. The third seam 193 attaches the sixth end 176 of the third strap 133 to the superior end 188 of the pelvic strap 111 such that the third strap 133 lays flush with the sixteenth end 186 of the pelvic strap 111. The fourth seam 194 attaches the seventh end 177 of the fourth strap 134 to the inferior end 187 of the pelvic strap 111 such that the fourth strap 134 lays flush with the sixteenth end 186 of the pelvic strap 111.

The fifth seam 195 attaches the ninth end 179 of the fifth strap 135 to the face of the pelvic strap 111. The sixth seam 196 attaches the pocket sheeting 122 to the barrier 121 to form the pocket that stores the body harness 101.

An adhesive attaches the first hook/loop surface 151 of the first hook and loop fastener 141 to the first end 171 of the first strap 131. An adhesive attaches the second hook/loop surface 152 of the first hook and loop fastener 141 to the fourth end 174 of the second strap 132. An adhesive attaches the third hook/loop surface 153 of the second hook and loop fastener 142 to the fifth end 175 of the third strap 133. An adhesive attaches the fourth hook/loop surface 154 of the second hook and loop fastener 142 to the eighth end 178 of the fourth strap 134. An adhesive attaches the fifth hook/loop surface 155 of the third hook and loop fastener 143 to the eleventh end 181 of the sixth strap 136. An adhesive attaches the sixth hook/loop surface 156 of the third hook and loop fastener 143 to the thirteenth end 183 of the seventh strap 137.

The twelfth end 182 of the sixth strap 136 attaches to the barrier 121. The fourteenth end 184 of the seventh strap 137 attaches to the barrier 121.

In the first potential embodiment of the disclosure, the first seam 191 is a sewn seam. The second seam 192 is a sewn seam. The third seam 193 is a sewn seam. The fourth seam 194 is a sewn seam. The fifth seam 195 is a sewn seam. The sixth seam 196 is a sewn seam.

The following definitions were used in this disclosure:

Adhesive: As used in this disclosure, an adhesive is a chemical substance that can be used to adhere two or more objects to each other. Types of adhesives include, but are not limited to, epoxies, polyurethanes, polyimides, or cyanoacrylates, silicone, or latex based adhesives.

Align: As used in this disclosure, align refers to an arrangement of objects that are: 1) arranged in a straight plane or line; 2) arranged to give a directional sense of a plurality of parallel planes or lines; or, 3) a first line or curve is congruent to and overlaid on a second line or curve.

Bib: As used in this disclosure, a bib is a sheeting worn around the neck of a person to protect garments worn under the bib.

Correspond: As used in this disclosure, the term correspond is used as a comparison between two or more objects wherein one or more properties shared by the two or more objects match, agree, or align within acceptable manufacturing tolerances.

Fastener: As used in this disclosure, a fastener is a device that is used to join or affix two objects. Fasteners generally comprise a first element, which is attached to the first object and a second element which is attached to the second object such that the first element and the second element join to affix the first object and the second object. Common fasteners include, but are not limited to, hooks, zippers, snaps, buttons, buckles, quick release buckles, or hook and loop fasteners.

Flush: As used in this disclosure, the term flush is used to describe the alignment of a first surface and a second surface on a single plane.

Geometrically Similar: As used in this disclosure, geometrically similar is a term that compares a first object to a second object wherein: 1) the sides of the first object have a one to one correspondence to the sides of the second object; 2) wherein the ratio of the length of each pair of corresponding sides are equal; 3) the angles formed by the first object have a one to one correspondence to the angles of the second object; and, 4) wherein the corresponding angles are equal. The term geometrically identical refers to a situation where the ratio of the length of each pair of corresponding sides equals 1.

Harness: As used in this disclosure, a harness is an apparatus comprising a plurality of straps and one or more fasteners used to fasten or anchor a first person or first object to a second object.

Hook and Loop Fastener: As used in this disclosure, a hook and loop fastener is a fastener that comprises a hook surface and a loop surface. The hook surface comprises a plurality of minute hooks. The loop surface comprises a surface of uncut pile that acts like a plurality of loops. When the hook surface is applied to the loop surface, the plurality of minute hooks fastens to the plurality of loops securely fastening the hook surface to the loop surface. A note on usage: when fastening two objects the hook surface of a hook and loop fastener will be placed on the first object and the matching loop surface of a hook and loop fastener will be placed on the second object without significant regard to which object of the two objects is the first object and which of the two objects is the second object. When the hook surface of a hook and loop fastener or the loop surface of a hook and loop fastener is attached to an object this will simply be referred to as the "hook/loop surface" with the understanding that when the two objects are fastened together one of the two objects will have a hook surface and the remaining object will have the loop surface.

Hyoid: As used in this disclosure, a hyoid refers to a three-sided structure comprising a crossbeam, a first arm, and a second arm. In a hyoid, the first arm and the second arm project away from the crossbeam: 1) in the same direction; 2) at a roughly perpendicular angle to the crossbeam, and, 3) the span of the length of the first arm roughly equals the span of the length of the second arm. Hyoids have a U shaped appearance.

Infant: As used in this disclosure, an infant refers to a human child who: 1) is under 18 months old; and, 2) has not yet learned to walk.

Inferior: As used in this disclosure, the term inferior refers to a directional reference that is parallel to and in the same direction as the force of gravity.

Mirror Image: As used in this disclosure, a mirror image refers to a second object that is a reproduction of a first object wherein the second object is identical to the first object except that the orientation of the second object is reversed relative to the first object as if the second object has been reflected by a plane of a mirror (often called the mirror plane or plane of reflection).

Pelvis: As used in this disclosure, the pelvis refers to a bone structure near the base of the spine to which buttocks and the legs are joined. As used in this disclosure, the term pelvis is a more generally expanded to describe the above-described region of the body. As used in this disclosure, the adjectival form of pelvis is pelvic.

Perimeter: As used in this disclosure, a perimeter is one or more curved or straight lines that bounds an enclosed area on a plane or surface. The perimeter of a circle is commonly referred to as a circumference.

Pocket: As used in this disclosure, a pocket is a small pouch or storage space formed in an object. Pockets are often formed by joining a second textile or a second sheeting to a first textile or a first sheeting, respectively, by sewing or heat-sealing respectively.

One to One: When used in this disclosure, a one to one relationship means that a first element selected from a first set is in some manner connected to only one element of a second set. A one to one correspondence means that the one to one relationship exists both from the first set the second set and from the second set to the first set. A one to one fashion means that the one to one relationship exists in only one direction.

Seam: As used in this disclosure, a seam is a joining of: 1) a first textile to a second textile; 2) a first sheeting to a second sheeting; or, 3) a first textile to a first sheeting. Potential methods to form seams include, but are not limited to, a sewn seam, a heat-bonded seam, an ultrasonically bonded seam, or a seam formed using an adhesive.

Sewn Seam: As used in this disclosure, a sewn seam a method of attaching two or more layers of textile, leather, or other material through the use of a thread, a yarn, or a cord that is repeatedly inserted and looped through the two or more layers of textile, leather, or other material.

Sheeting: As used in this disclosure, a sheeting is a material, such as a textile, a plastic, or a metal foil, in the form of a thin flexible layer or layers.

Strap: As used in this disclosure a strap is a strip of leather, cloth, or other flexible material, often with a buckle, that is used to fasten, secure, carry, or hold onto something.

Strip: As used in this disclosure, the term describes a long and narrow object of uniform thickness that appears thin relative to the length of the object. Strips are often rectangular in shape.

Superior: As used in this disclosure, the term superior refers to a directional reference that is parallel to and in the opposite direction of the force of gravity.

Textile: As used in this disclosure, a textile is a material that is woven, knitted, braided or felted. Synonyms in common usage for this definition include fabric and cloth.

Toddler: As used in this disclosure, a toddler is a human child between the ages of one and three who has learned to walk.

Truss: As used in this disclosure, the term truss means to gather or secure a material in a bundle.

Webbing: As used in this disclosure, a webbing is strong, close woven or knitted fabric that is used for straps or belting. As used in this disclosure, webbing is a fully formed material that is only cut to length for use. Webbing is not formed by cutting broader materials into strips.

With respect to the above description, it is to be realized that the optimum dimensional relationship for the various components of the invention described above and in FIGS. 1 through 6 include variations in size, materials, shape, form, function, and manner of operation, assembly and use, are deemed readily apparent and obvious to one skilled in the art, and all equivalent relationships to those illustrated in the drawings and described in the specification are intended to be encompassed by the invention.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

The inventor claims:

1. A safety harness comprising: a body harness and a bib; wherein the safety harness is further configured for use with a person; wherein the person is selected from the group consisting of an infant and a toddler; wherein the person is further defined with a pelvis; wherein the safety harness is configured for use with a chair; wherein the body harness attaches the person to the chair; wherein the bib is a protective garment; wherein the body harness comprises a pelvic strap, a plurality of harness straps, and a plurality of harness fasteners; wherein the plurality of harness fasteners attach to the plurality of harness straps; wherein the plurality of harness straps attach to the pelvic strap; wherein the plurality of harness fasteners comprises a first hook and loop fastener and a second hook and loop fastener; wherein the first hook and loop fastener is a hook and loop fastening device; wherein the first hook and loop fastener is further defined with a first hook/loop surface and a second hook/loop surface; wherein the second hook and loop fastener is a hook and loop fastening device; wherein the second hook and loop fastener is further defined with a third hook/loop surface and a fourth hook/loop surface; wherein the first hook and loop fastener attaches the first strap to the second strap; wherein the first hook/loop surface attaches to the second hook/loop surface to form the first hook and loop fastener; wherein the safety harness is assembled using a first seam, a second seam, a third seam, and a fourth seam; wherein the first seam attaches the second end of the first strap to the superior end of the pelvic strap such that the first strap lays flush with a fifteenth end of the pelvic strap; wherein the second seam attaches a third end of the second strap to the inferior end of the pelvic strap such that the second strap lays flush with the fifteenth end of the pelvic strap; wherein the third seam attaches a sixth end of the third strap to the superior end of the pelvic strap such that the third strap lays flush with a sixteenth end of the pelvic strap; wherein the fourth seam attaches a seventh end of the fourth strap to the inferior end of the pelvic strap such that the fourth strap lays flush with the sixteenth end of the pelvic strap.

2. The safety harness according to claim 1
wherein the bib stores the body harness;
wherein the bib is worn by the person.

3. The safety harness according to claim 2
wherein the plurality of harness straps attach the pelvic strap to the back of the chair;
wherein the plurality of harness straps trusses the body harness into a package suitable for storage in the bib.

4. The safety harness according to claim 3 wherein the plurality of harness fasteners is a collection of fasteners that secure the plurality of harness straps to the back of the chair.

5. The safety harness according to claim 4
wherein the pelvic strap is a webbing;
wherein the pelvic strap is further defined with a fifteenth end, a sixteenth end, an inferior end, and a superior end;
wherein the pelvic strap secures the torso of the person to the chair.

6. The safety harness according to claim 5
wherein the plurality of harness straps comprises a first strap, a second strap, a third strap, and a fourth strap;
wherein the first strap is further defined with a first end and a second end;
wherein the second strap is further defined with a third end and a fourth end;
wherein the third strap is further defined with a fifth end and a sixth end;
wherein the fourth strap is further defined with a seventh end and an eighth end;
wherein the fifth strap is further defined with a ninth end and a tenth end;
wherein the first strap is a webbing;
wherein the second strap is a webbing;
wherein the third strap is a webbing;
wherein the fourth strap is a webbing.

7. The safety harness according to claim 6
wherein the plurality of harness straps comprises a first strap, a second strap, a third strap, a fourth strap, and a fifth strap;
wherein the fifth strap is a webbing;
wherein the fifth strap is adapted to be used to secure an object thereto or to be used in trussing the body harness into a package that fits in the bib.

8. The safety harness according to claim 7
wherein the second hook and loop fastener attaches the third strap to the fourth strap;
wherein the third hook/loop surface attaches to the fourth hook/loop surface to form the second hook and loop fastener.

9. The safety harness according to claim 8
wherein the bib comprises a barrier and a pocket sheeting;
wherein the pocket sheeting attaches to the barrier.

10. The safety harness according to claim 9
wherein the barrier comprises a sixth strap, a seventh strap, and a third hook and loop fastener;
wherein the third hook and loop fastener is a fastening device that attaches the sixth strap to the seventh strap;
wherein the sixth strap attaches to the seventh strap to attach the barrier to the person;
wherein the sixth strap is further defined with an eleventh end and a twelfth end;

wherein the seventh strap is further defined with a thirteenth end and a fourteenth end;
wherein the third hook and loop fastener is further defined with a fifth hook/loop surface and a sixth hook/loop surface;
wherein the fifth hook/loop surface attaches to the sixth hook/loop surface to form the third hook and loop fastener.

11. The safety harness according to claim 10
wherein the barrier is a sheeting;
wherein the pocket sheeting is a sheeting
wherein the sixth strap is a webbing;
wherein the seventh strap is a webbing.

12. The safety harness according to claim 11
wherein a portion of the perimeter of the pocket sheeting is geometrically similar to a portion of the perimeter of the barrier;
wherein the pocket sheeting is larger than the barrier;
wherein the pocket sheeting is aligned with and attached to the barrier;
wherein the pocket sheeting forms a partially enclosed space between the pocket sheeting and the barrier that forms a pocket to store the body harness.

13. The safety harness according to claim 12
wherein the safety harness is further assembled using a fifth seam;
wherein the fifth seam attaches the ninth end of the fifth strap to the face of the pelvic strap.

14. The safety harness according to claim 13
wherein the safety harness is further assembled using a sixth seam;
wherein the sixth seam attaches the pocket sheeting to the barrier.

15. The safety harness according to claim 14
wherein the first seam is a sewn seam;
wherein the second seam is a sewn seam;
wherein the third seam is a sewn seam;
wherein the fourth seam is a sewn seam;
wherein the fifth seam is a sewn seam;
wherein the sixth seam is a sewn seam.

\* \* \* \* \*